US009141930B2

(12) United States Patent
Suvernev et al.

(10) Patent No.: US 9,141,930 B2
(45) Date of Patent: Sep. 22, 2015

(54) METHOD AND APPARATUS FOR MAKING CHANGES TO A QUANTITY FOR A TIME INTERVAL WITHIN A TIME SERIES

(75) Inventors: Andrei Suvernev, Baiertal (DE);
Thorsten Glebe, Leimen (DE);
Volkmar Soehner, Sinsheim (DE);
Daniel Booss, Wiesloch (DE)

(73) Assignee: SAP SE, Walldorf (DE)

( * ) Notice: Subject to any disclaimer, the term of this patent is extended or adjusted under 35 U.S.C. 154(b) by 2413 days.

(21) Appl. No.: 11/155,732

(22) Filed: Jun. 16, 2005

(65) Prior Publication Data
US 2007/0005457 A1 Jan. 4, 2007

(51) Int. Cl.
*G06Q 10/08* (2012.01)
(52) U.S. Cl.
CPC .................... *G06Q 10/087* (2013.01)
(58) Field of Classification Search
CPC .................................... G06Q 10/087
USPC .................................... 705/22, 28
See application file for complete search history.

(56) References Cited

U.S. PATENT DOCUMENTS

| 2002/0087500 | A1* | 7/2002 | Berkowitz et al. | 707/1 |
| 2002/0116301 | A1* | 8/2002 | Chapman et al. | 705/29 |
| 2003/0225760 | A1* | 12/2003 | Ruuth et al. | 707/5 |
| 2004/0133591 | A1* | 7/2004 | Holenstein et al. | 707/102 |
| 2006/0085294 | A1* | 4/2006 | Boerner et al. | 705/28 |

* cited by examiner

*Primary Examiner* — Ramsey Refai
(74) *Attorney, Agent, or Firm* — Schwegman Lundberg & Woessner, P.A.

(57) ABSTRACT

A method is described that involves providing a persisted quantity for a time series time interval to a first transaction, then, providing the same persisted quantity to a second transaction that operates in parallel with the first transaction. The second transaction is not permitted to change the persisted quantity. The method also involves replacing the persisted quantity with a second persisted quantity within the time series. The second persisted quantity is determined by the first transaction. The method also involves writing a persisted quantity change for the time series time interval. The persisted quantity change is determined by the second transaction.

19 Claims, 12 Drawing Sheets

$\#_1' = \#_1 + D_1$

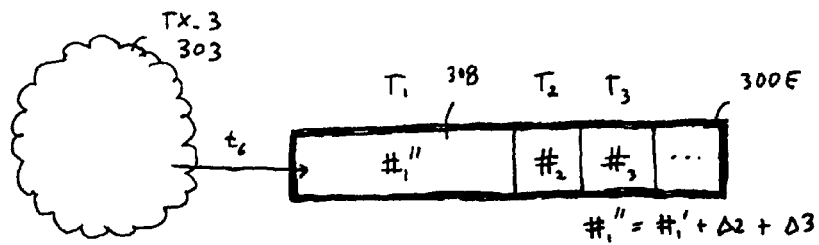
FIG. 3(5)
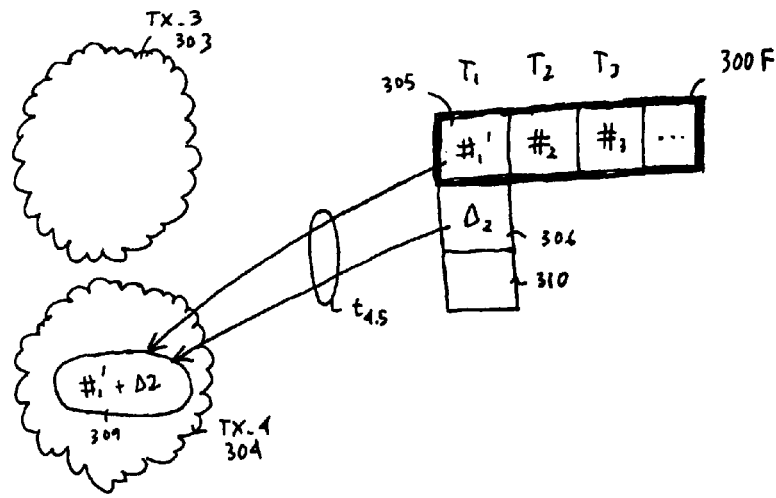
FIG. 3(4.5)
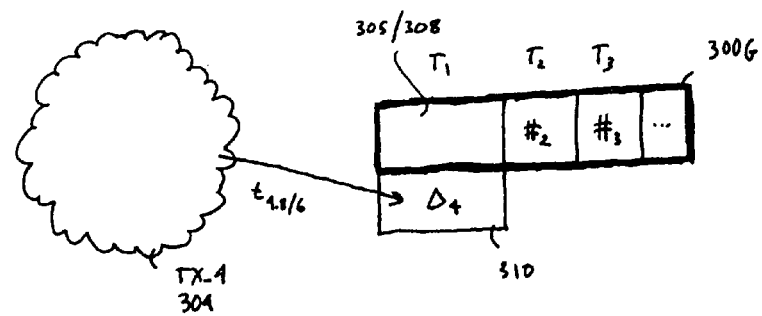
FIG. 3(4.8/6)

METHOD AND APPARATUS FOR MAKING CHANGES TO A QUANTITY FOR A TIME INTERVAL WITHIN A TIME SERIES

FIELD OF INVENTION

The field of invention relates generally to the software arts, and, more specifically, to parallel time interval processing through shadowing.

BACKGROUND

A "time series" tracks quantity over time. For example, in the case of supply chain management software, a time series for a particular item may be used to track, over time, the quantity that a warehouse has "in stock" for the particular item. Here, the time series would track the "ups and downs" in the quantity of the item in the warehouse in response to various deliveries/shipments of the item to/from the warehouse that occur over time.

A typical supply chain management process involves the accessing of time series data to check into the availability of an item or resource. For example, again using a warehouse example, if a transaction desires to ship "X" amount of a specific item at a certain time, the supply chain management software will "check" to make sure that at least X items will be in the warehouse at that time.

A time series may be organized by specifying a quantity for each of a series of equally extensive time intervals. According to the scale 100A observed in FIG. 1*a*, quantity is measured along the vertical axis and the time intervals T1, T2, T3, T4, T5, T6 are observed along the horizontal axis. Each time interval can be viewed as a "bucket" that sums together changes made to an item's quantity that arise within the bucket's corresponding time interval.

For example, FIG. 1*b* shows time series data 100B for an "order" (Order_1) in which an item's quantity is made to: 1) increase by one unit (+1) within bucket T1; 2) increase by two units (+2) within bucket T2; and, 3) increase by three units (+3) within bucket T3. FIG. 1*c* shows the resulting time series data (TS) if a second order (Order_2) for the item is placed that reduces the item's quantity by one unit (−1) in each of the T2 and T3 time intervals. Here, note the summation of Order_1 and Order_2 yields a net quantity for the item of +1 within time interval T2 and +2 within time interval T3.

FIG. 1*d* indicates that an order can, conceivably, add and subtract to an item's quantity. Specifically, Order_3 increases the item's quantity by one unit within time interval T2 and decreases the item's quantity by one unit within time interval T3. Again, summing over each of the three orders within their respective buckets, yields a time series (TS) having a quantity of +1 within time interval T1, +2 within time interval T2, and, +1 within time interval T3.

Note that in actual implementation the time interval for each specific bucket may be "open" on one end and "closed" on the other end (e.g., over a time interval of t=x to t=y, the term "time interval" may be any time over a time period of (x,y] or [x,y)). Also, as suggested by the time series (TS) notations observed in FIGS. 1*c* and 1*d* (i.e., (T1; +1); (T2; +1); (T3; +2) in FIG. 1*c* and (T1; +1); (T2; +2); (T3; +1) in FIG. 1*d*), a time series may be stored as a plurality of time interval/quantity associations.

FIG. 2 shows a particular problem associated with prior art time series implementations. Specifically if, at approximately the same time, two different transactions desire to implement a quantity change at the same time interval, one of the transactions will be permitted to change the time series data while the other will be "blocked" so as to be prevented from doing so. Here, the blocked transaction will have to wait until the non-blocked transaction implements its quantity change to the time interval data before the blocked transaction will be permitted to access and change the time interval's time series data. In this sense, changes to the quantity of a particular time series time interval are made "serially" and not "in parallel".

FIG. 2 shows the problem schematically. Here, transaction TX_1 201 is permitted to read the quantity #1 for time interval T1 for purposes of making a change to the quantity #1. Transaction TX_2 202 attempts to access and change the same quantity #1 while transaction TX_1 201 still has access to it (e.g., transaction TX_2 attempts to change the quantity #1 at time t2 just after the time t1 that transaction TX_1 was granted access to it). Transaction TX_2 202 is blocked from accessing the quantity #1 because of the earlier access by transaction TX_1 201. By contrast, transaction TX_2 202 is not blocked from another time interval's quantity data (e.g., quantity #2 from time interval T2 at time t3) for purposes of changing it provided no other transaction has already accessed it for purposes of changing it.

Moreover, in the prior art, the overall penalty stemming from a lock is exacerbated because the resolution or granularity of a lock spans across multiple time interval buckets rather than a single time interval bucket. As a consequence, the probability of a transaction being locked out of a time interval is not the probability of an earlier transaction having a need for the same time interval, but rather, the probability of an earlier transaction having a need for any time interval within a range of time intervals about the same time interval.

SUMMARY

A method is described that involves providing a persisted quantity for a time series time interval to a first transaction, then, providing the same persisted quantity to a second transaction that operates in parallel with the first transaction. The second transaction is not permitted to change the persisted quantity. The method also involves replacing the persisted quantity with a second persisted quantity within the time series. The second persisted quantity is determined by the first transaction. The method also involves writing a persisted quantity change for the time series time interval. The persisted quantity change is determined by the second transaction.

FIGURES

The present invention is illustrated by way of example and not limitation in the figures of the accompanying drawings, in which like references indicate similar elements and in which:

FIGS. 1(*a*) through 1(*d*) show concepts pertaining to a time series (prior art);

FIG. 2 demonstrates a serial time interval quantity change process (prior art);

FIG. 3(2) shows parallel transactions accessing same time interval quantity data;

FIG. 3(3) shows parallel transactions implementing changes to same time interval quantity data;

FIG. 3(4) shows a subsequent transaction gaining a "consistent view" time interval quantity perspective of the time series state depicted in FIG. 3(3);

FIG. 3(5) shows the subsequent transaction of FIG. 3(4) updating the time interval quantity data;

FIG. 3(4.5) shows a process that may occur in a timeframe after that depicted in FIG. 3(4) and before that depicted in FIG. 3(5), in which, a second subsequent transaction gains a consistent view time interval perspective of the time series state depicted in FIG. 3(4);

FIG. 3(4.8/6) shows the second subsequent transaction of FIG. 3(4.5) updating the time interval quantity data either: 1) after the state depicted in FIG. 3(4.5) and before the state depicted in FIG. 3(5); or, 2) after the state depicted in FIG. 3(5);

DETAILED DESCRIPTION

Figure 1A:
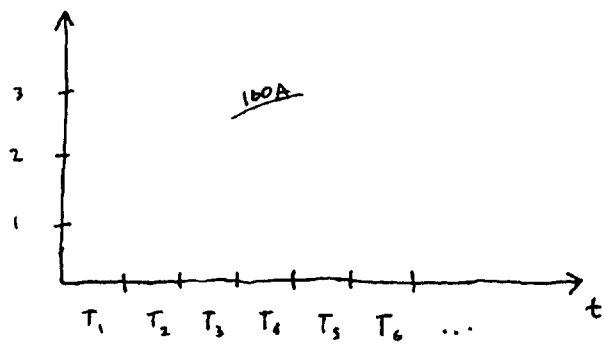
Figure 1B:
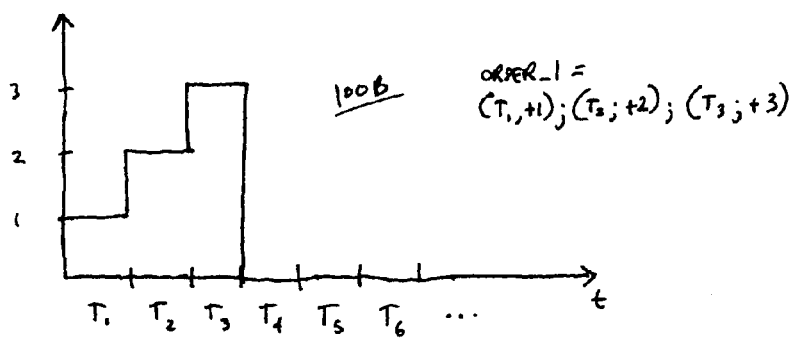
Figure 1C:
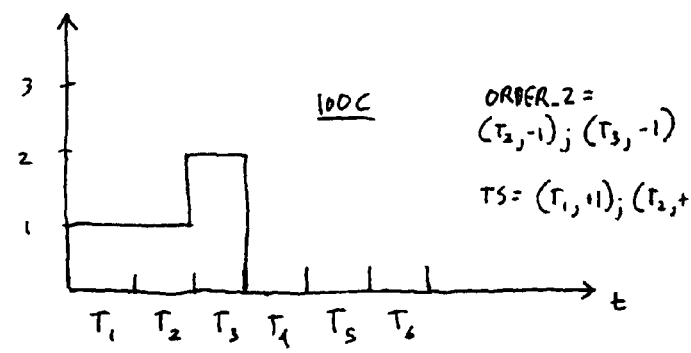
Figure 1D:
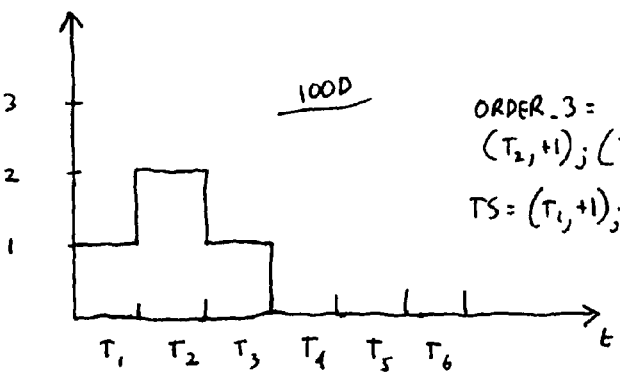
Figure 2:
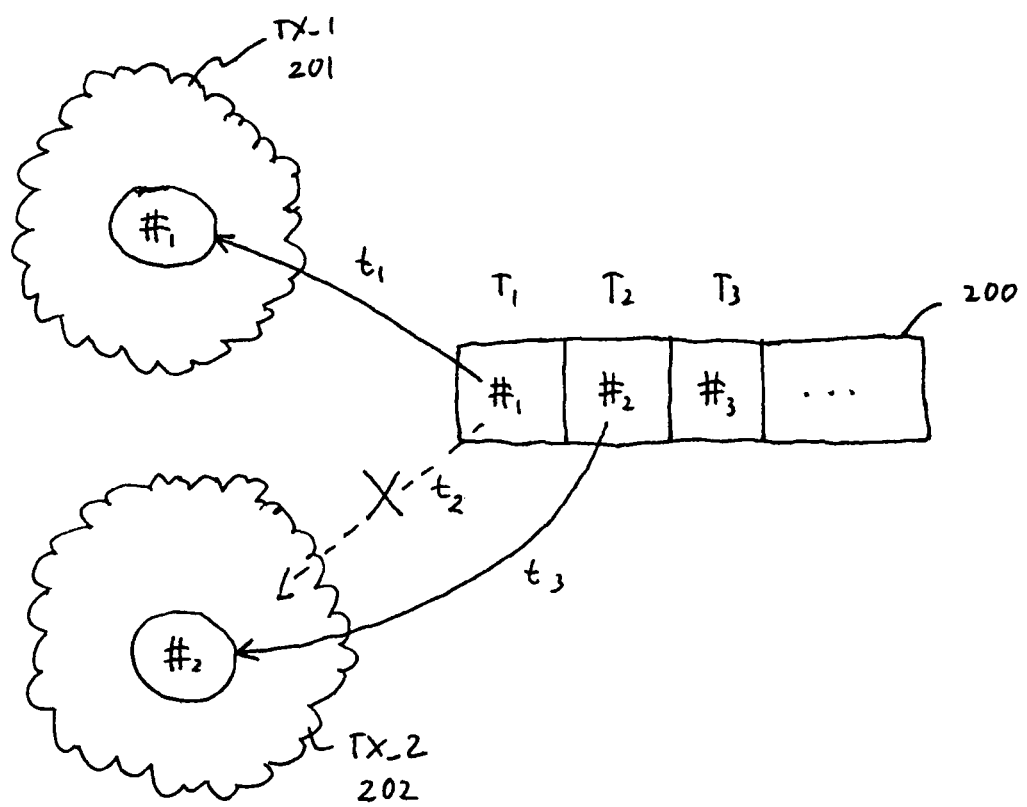
Figure 3:
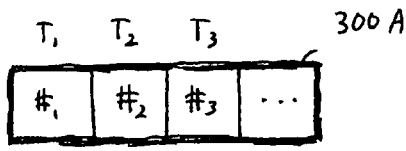
FIG. 3(1) shows a time series.
Figure 3:
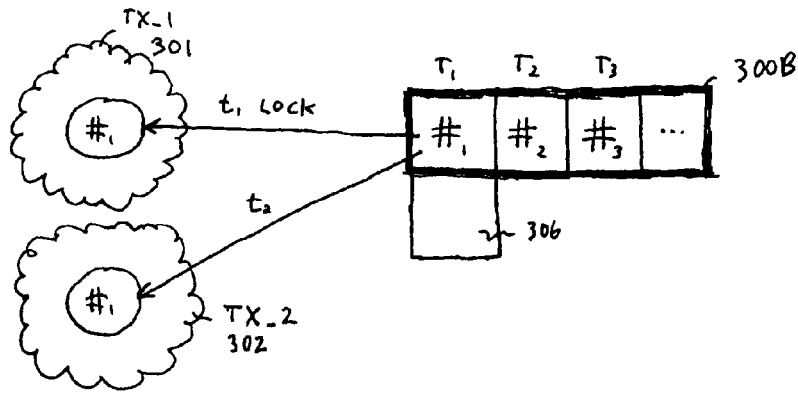
Figure 3:
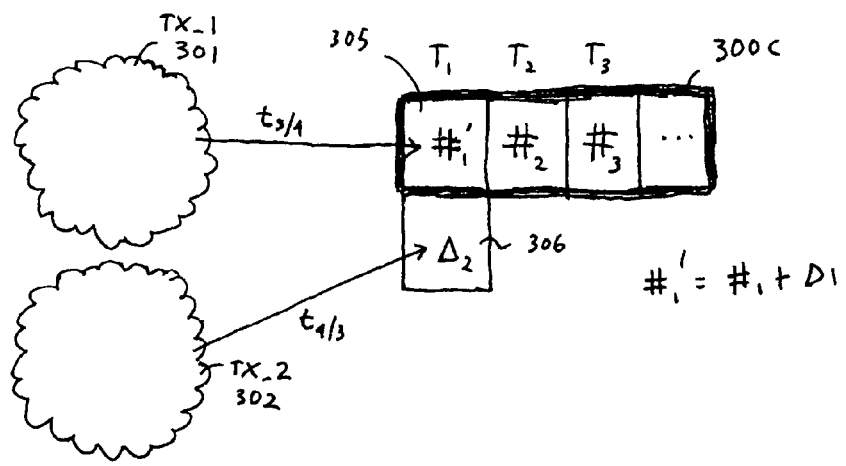
Figure 3:
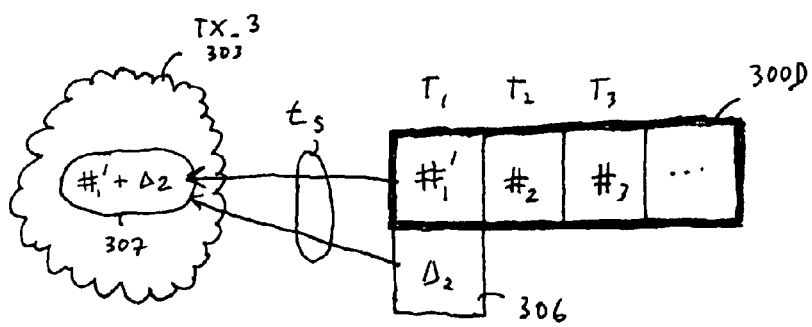

The present application describes a system capable of implementing parallel (rather than serial) changes to a particular time interval quantity within a time series. FIG. 3(1) shows the state of a time series at an initial time. According to the time series representation 300A presented in FIG. 3(1), time interval T1 has an associated quantity #1, time interval T2 has an associated quantity #2, time interval T3 has an associated quantity #3, etc. In an embodiment, the various quantities #1, #2, #3, etc. are implemented as tuples of quantities.

FIG. 3(2) shows a situation in which a first transaction TX_1 301 accesses the #1 quantity data for time interval T1 at a time t1. Here, the first transaction's access of the #1 quantity is of a character that permits the first transaction TX_1 301 to change the #1 quantity (e.g., by placing an order that increases/decreases the quantity above/below the specific #1 amount) if the first transaction TX_1 301 desires to. For instance, according to one implementation, a transaction TX_1 301 will only lock the #1 quantity if the transaction intends to actually make a change to it (i.e., locks are made for write accesses but not for read-only accesses).

Subsequently, a second transaction TX_2 302 that may (or presently desires to) also make a change to the quantity data for the same T1 time interval is permitted to gain a "consistent view" of the time series at the time interval T1. A consistent view for a particular transaction is the formal "present" value of a time series quantity at the time the transaction starts. According to one perspective, a transaction's consistent view of a time interval quantity is the resulting quantity value when all "committed" changes to the time interval quantity have been accounted for as of the moment the transaction is deemed to have started.

Note that, according to this perspective, transactions having different start times can have different consistent views. According to one approach, at the time a particular transaction starts, a "snapshot" is effectively taken of the time series data for the use of the transaction. For purposes of the example explained with respect to FIG. 1, for simplicity, it may be assumed that the start times of transactions TX_1 301 and TX_2 are sufficiently close to one another such that they each maintain the same consistent view for the time intervals depicted in FIG. 3(1) through FIG. 3(4.8/6).

A transaction is a software driven attempt to schedule the usage of one or more resources that have been modeled in some fashion. For example, in the case of a large scale distribution network, the modeled resources may include a multitude of warehouses and the trucks that transport goods between them. A singe transaction may involve a software driven attempt to schedule these resources such that a certain amount of goods are shipped from one end of the network to the other end of the network within a certain timeframe.

Here, the transaction might "check into" the availability of the various resources (by checking into the state of the data maintained by their corresponding models), determine a workable scheme (e.g., determine a certain combination of warehouses and trucking routes), and, write changes to affected model data to reflect the imposition of the scheme onto the underlying resources (e.g., update capacity data for both affected warehouse models and affected truck models).

According to an implementation, each transaction executes a "commit protocol" in which the ability to make desired changes to affected resource model data is first confirmed (e.g., be checking into the resource availability for all affected resources), and, in response to such confirmation, is actually "committed" (i.e., the desired changes are formally entered into resource model data and persistently stored).

According to at least one type of commit protocol, model data changes are written before formal commitment. If, for some reason, the written scheme is not workable (e.g., one of the written changes can not be implemented), the written changes are "rolled back" such that the model data falls back to its state prior to the writing of the changes. Here, a single transaction may experience multiple rollbacks for a single scheme before actually being able to commit a set of changes for a final workable scheme.

Importantly, multiple transactions may execute in parallel. That is, the time period from the creation of a transaction to its commit time, for each of a plurality of transactions, may overlap to some extent. It is in this context that the problems of the prior art approach can be appreciated in cases where multiple parallel transactions desired to change the quantity within a same time interval over the course of their execution. If a first transaction was given the power to change the time interval's quantity, a second parallel transaction could not commit until after the first transaction was committed and the "new" updated quantity information was accessed by the second transaction.

FIG. 3(2) shows parallel transactions TX_1 301 and TX_2 302 each being permitted access to quantity #1 for time interval T1, where, each of transactions TX_1 301 and TX_2 302 has the power to impose a change to the #1 quantity value. According to an approach, the first transaction to gain access to a time interval quantity (in this case transaction TX_1 301 at time t1) is permitted to lock the time interval data so that it can make a change to the time interval data directly (i.e., a new value #1'=#1+Δ1 can be directly written into the time series data as observed in FIG. 3(3)).

Any other transactions that desire access to the same #1 quantity value for purposes of making a change to it, while it is locked by transaction TX_1 301 (i.e., before transaction TX_1 301 is able to commit), in this case transaction TX_2 302 at time t2, are permitted access to the #1 quantity value but cannot change the #1 quantity value directly (e.g., are only given read-only access). Instead, the change is recorded in "shadow" space 306 that is associated with the T1 interval. That is, the shadow space 306 is separate from the time series data 300B itself, but, is nevertheless associated with the time interval that the "subsequent" transaction TX_2 302 seeks the ability to make a change to.

FIG. 3(3) shows the pair of transactions TX_1 301, TX_2 302 updating their corresponding T1 time interval changes. Here, as alluded to above, note that the first transaction TX_1 301 updates the time series data 300C directly in the T1 time interval 305 (by recording #1'=the summation of the #1 quantity and the change Δ1 to it imposed by the first transaction TX_1 301), but, the second transaction TX_2 302 records just the change Δ2 imposed by the second transaction TX_2 302 to the T1 time interval quantity, where, moreover, the recorded change Δ2 is stored in the shadow space 306 rather than the time series data 300B. The storing of the #1' data 305 in the time series 300C and the Δ2 change in the shadow space 306 may each be made upon commitment or as an initial "soft-write" prior to commitment and subject to a subsequent roll-back of the TX_1 301 and TX_2 302 transactions, respectively.

In one implementation, the time series 300 is a persisted data structure (e.g., a persisted data object or database table). When the first transaction TX_1 301 is granted access to the #1 quantity, a "shared lock" is placed on the #1 entry for the T1 time interval in the persisted time series 300 data structure. As is known in the art, a shared lock is typically used to permit one transaction to change persisted data while restricting all other transactions that seek the same data (prior to the first transaction's commit) to only be permitted to read the data item (i.e., writes are not permitted).

For the approach of FIGS. 3(2) and 3(3), placement of the shared lock on quantity #1 for transaction TX_1 301 prevents transaction TX_2 302 from changing the time series data 300 for time interval T1, yet, permits transaction TX_2 302 to gain a consistent view of the T1 time interval so that it can perform whatever function it needs to perform in reaching commitment. Note that it is irrelevant in which order the pair of transactions 301, 302 make their respective writes. Hence, the t3/4, t4/3 nomenclature observed in FIG. 3(3).

FIGS. 3(4) and 3(5) together show a process for incorporating the shadow space 306 quantity change Δ2 into the time series data 305 for time interval T1 so that an accurate consistent view is reflected in the time series data 300 for any subsequently starting transactions. According to the exemplary process of FIGS. 3(4) and 3(5), a third transaction TX_3 303 starts after transactions TX_1 and TX_2 have committed their respective #1' and Δ1 values for time interval T1. Therefore the "consistent view" of time interval T1 for transaction TX_3 303 includes both the #1' quantity value in the actual time series data and the Δ1 change value in the shadow space 306 for the T1 time interval.

Moreover, according to this same example, transaction TX_3 303 seeks access to the time series data 305 of time interval T1, for purposes of making a change to this data 305, at a time when no other transaction has placed a lock on the data 305. According to an implementation, if the actual time series data 305 (#1') for a specific time interval (T1) is unlocked at the time a transaction (transaction TX_3 303) desires to make a change to the data, the transaction not only locks the time series data (305) but also locks any unlocked shadow space entries.

Therefore, in this example, assuming shadow space 306 is also unlocked, transaction TX_3 303 would also seek to place a lock on shadow space 306 having quantity change Δ2. As such, as depicted in FIG. 3(4), transaction TX_3 303 is able to lock and read both the #1' quantity value and the Δ2 change value. The transaction TX_3 303 then adds the time series quantity #1' and the change Δ2 together.

By adding the time series quantity #1' and the shadow space quantity change Δ2 together, the transaction TX_3 303 is essentially determining its correct consistent view 307 for time interval T1. That is, the proper consistent view 307 of time interval T1 for transaction TX_3 303 is #1'+Δ2. At a later point in time t6, reflected in FIG. 3(5), transaction TX_3 303 writes an updated version #1" of the quantity for time interval T1 in the time series data 307 which is essentially its consistent view #1'+Δ2 summed with the change Δ3 imposed by transaction TX_3 303. As such, as observed in FIG. 3(5), at time t6 transaction TX_3 303 writes a new quantity #1"=#1'+Δ2+Δ3 for time interval T1 within the time series data 308. Note that the shadow space 306 has also been discarded.

Note from the description above that, in an implementation, a shadow space itself can be individually locked and unlocked. Here, similar to the time series data, a lock placed on an item by a transaction means the transaction has the power to change the "locked" value. Other transactions are still free to read the locked item (but they cannot change it). Here, the ability to lock and unlock a shadow space entry permits the "reuse" of a shadow space entry by different transactions.

As will be described in more detail below with respect to FIG. 4, the number of shadow space entries for a particular time interval can increase in cases where a number of different, parallel transactions desire access to the same time interval. As a general rule, a transaction will lock the actual time series data 300 for the time interval if it is unlocked. If the actual time series quantity value is locked, however, a transaction is free to write its change into a shadow space entry for the time interval (as discussed above with respect to FIGS. 3(1) and 3(2)).

Here, if there are any "unlocked" shadow space entries, the transaction will lock one of them and store its change there rather than have another shadow space entry newly created. If all shadow space entries are locked, however, a new shadow space entry will be created. The possibility that, at a given time from the perspective of a transaction, some shadow spaces may be unlocked while others may be locked is consequence of the fact that consistent views are a function of transaction start time, and, that parallel transactions can commit at different times.

FIG. 3(4.5) shows a process that may occur after time t5 in FIG. 3(4) and before time t6 observed in FIG. 3(5) (i.e., after transaction TX_3 has read the data for time interval T1 but before transaction TX_3 has committed any changes for time interval T1). Within this time period, a fourth transaction TX_4 304 is observed reading both the time series quantity 305 and the shadow space 306 for purposes of gaining the proper consistent view of the time series (again, assume transaction TX_4 304 has started after transactions TX_1 and TX_2 have committed). Here, because transaction TX_4 304 is reading the data for time interval T1 after transaction TX_3 303, the lock on the time series quantity 306 maintained by transaction TX_3 303 will be recognized, and, transaction TX_4 304 will be made to write any quantity change to shadow space rather than the time series 300F. Moreover, because shadow space 306 is locked at the time transaction TX_4 304 accesses the T1 interval data, a new shadow space entry 310 is "opened" for transaction TX_4 304.

FIG. 3(4.8/6) shows transaction TX_4 304 writing its quantity change Δ4 into the "new" shadow space 310. The nomenclature 4.8/6 is intended to convey that the writing of the Δ4 quantity change may occur between times t4 and t5 (e.g., time "t4.8"); or, may occur after time t5 (time "t6"). If the Δ4 quantity change is written between times t4 and t5, at the time of the writing t4.8, the time series data 300G will reflect a value of #1' 305. By contrast, if the Δ4 quantity change is written after time t5, at the time of the writing t6, the time series data 300G will reflect a value of #1" 308.

Figure 4:
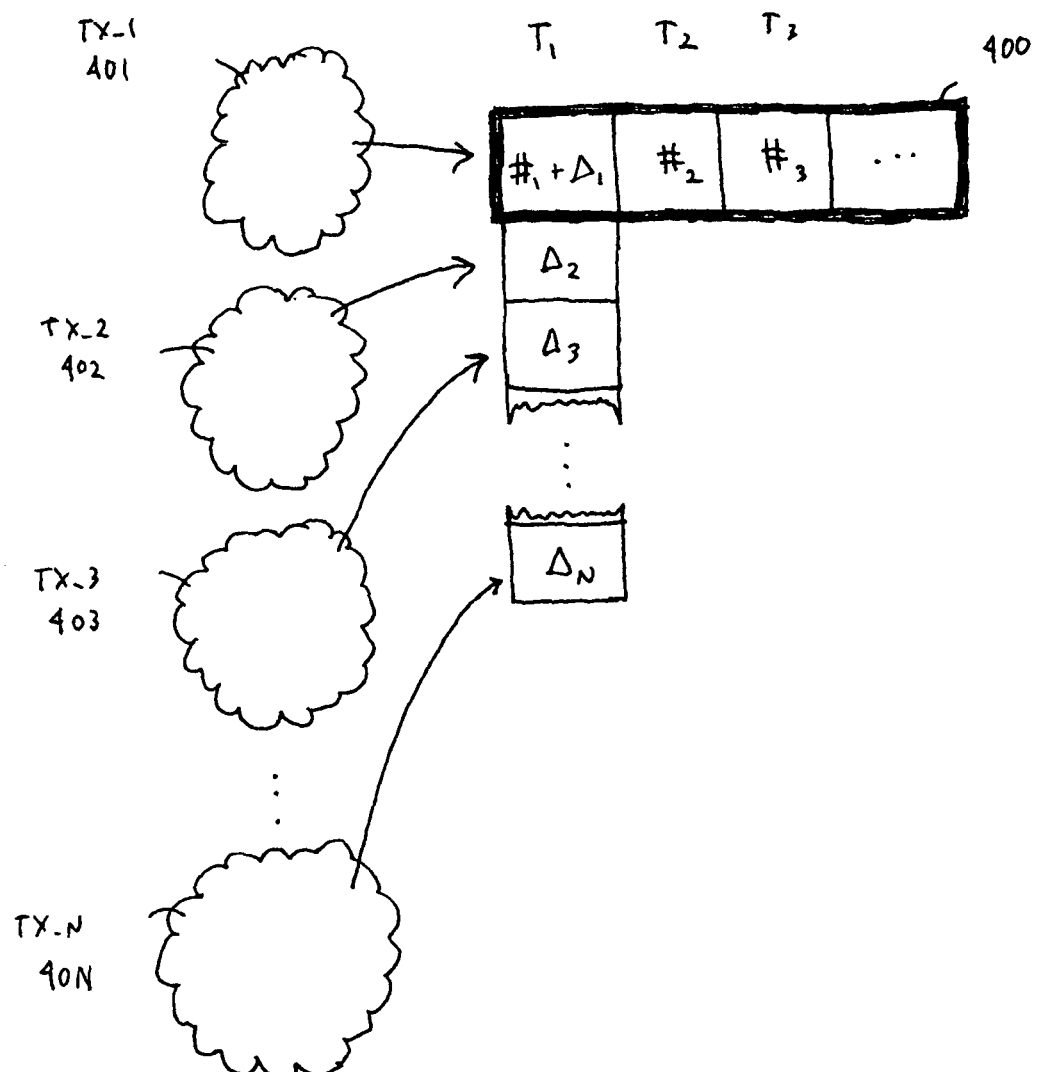
FIG. 4 shows multiple parallel transactions gaining their corresponding consistent views.

FIG. 4 shows that the number of shadow space entries may grow with each parallel transaction that may (or intends to) implement a quantity change to a same time interval T1. As observed in FIG. 4, there exist N transactions TX_1 through TX_N that operate in parallel and that desire access to quantity data for time interval T1. Here, it can be assumed that transaction TX_1 401 was the first of these transactions to gain access to the quantity data, and, as such, at time t1 reads value #1 from the time series 400. The update #1+Δ1 for transaction TX_1 401 will be written into the time series data 400 itself.

Before the update written by transaction TX_1 401 is committed, however, N−1 transactions (i.e., transaction TX_2 402 through TX_N 40N) desire access to the T1 time interval quantity data where none of the N transactions commit before any of the N−1 other transactions first seek access to the T1 time interval data. In this situation all entries are locked when any of transactions TX_2 through TX_N first attempt access, and, therefore, each of transactions TX_2 402 through TX_N 40N are allocated their own corresponding shadow space. With respect to the consistent view maintained by each of these applications, according to one implementation, each of transactions TX_2 402 through TX_N 40N will read only the time series quantity #1.

Recall that FIGS. 3(4) and 3(5) related to the "merger" of shadow space quantity change data with an actual time series quantity value. As discussed above, according to one implementation, whenever a transaction attempts to access a particular time interval's quantity data, an attempt is made to lock the actual quantity value (e.g., #1). If the lock is granted (i.e., if no other transaction has access to the actual quantity data for the time series), the transaction will also: 1) read the locked actual quantity value; 2) read all shadow space changes within the transaction's view (i.e., all of those that were committed before the transaction started), 3) lock those of the shadow space changes that were unlocked, 4) build a consistent view by adding (merging) all the shadow space changes that were read with the actual quantity value; 5) commit a new quantity value into the time series as its new actual quantity value for the applicable time interval (typically reflecting the consistent view summed with a change imposed by the transaction) and, 6) eliminate those shadow spaces that the transaction was able to lock in 3) (e.g., approximately simultaneously with the writing of the newly committed value).

Figure 5:
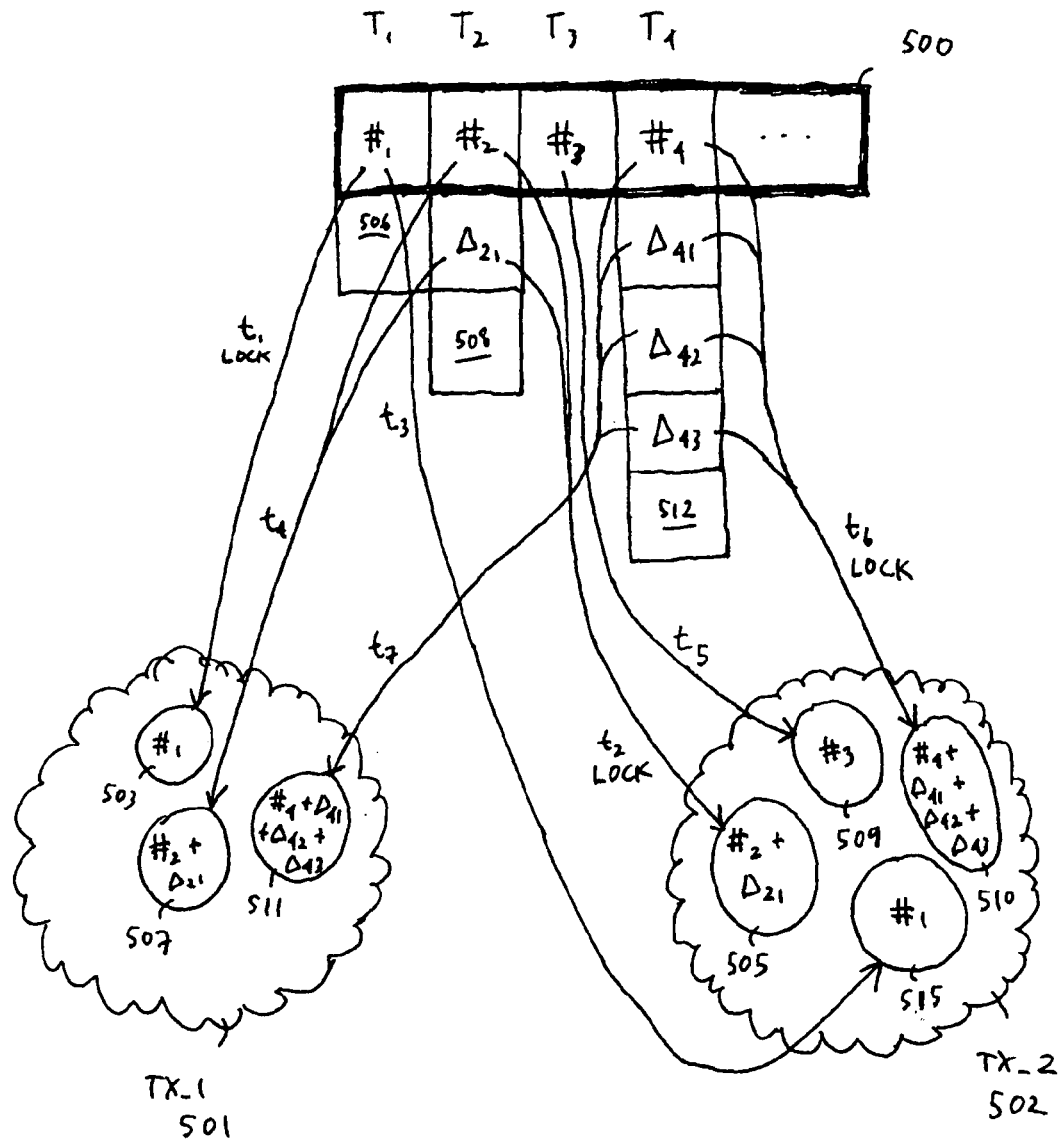
FIG. 5 shows two parallel transactions accessing quantity data for multiple time intervals for a particular time series.

FIG. 5 demonstrates an example where two parallel transactions operate over multiple time intervals, some of which are the same. The values observed for the time series data and its shadow spaces are assumed to be within the consistent view of both transactions TX_1 501 and TX_2 502. According to the example of FIG. 5, at time t1 transaction TX_1 501 acquires a lock on the quantity #1 for time interval T1. There are assumed to be no shadow spaces for time interval T1 at time t1 such that the consistent view 503 consists only of the actual quantity #1 itself 503 (i.e., no merger is performed). When transaction TX_1 501 commits an update it will write directly to the time series 500 and not to a shadow space.

At time t2 transaction TX_2 502 acquires a lock on the quantity #2 for time interval T2, and, for the sake of example, is also able to obtain a lock on shadow space Δ21. The transaction TX_2 502 reads the #2 quantity and the single committed change Δ21 that exists for the time interval T2 at time t2. The consistent view 505 is built by transaction TX_2 502 through the addition of the #2 and Δ21 values. When transaction TX_2 502 implements its change, it is free to write directly over the #2 value in the time series data and delete the shadow space holding committed change Δ21.

At time t3, transaction TX_2 502 desires access to the quantity data for time interval T1. Because the actual quantity #1 is presently locked by transaction TX_1 501, transaction TX_2 502 is only permitted to read the #1 quantity and cannot write an update to the time series 500 directly. Instead, transaction TX_2 502 will have to write the change it intends to make into shadow space 506. Again, because no committed shadow space data existed for time interval T1 at the time that transactions TX_1 and TX_2 started, the consistent view 515 maintained by transaction TX_2 includes only quantity value #1.

At time t4 transaction TX_1 501 desires access to the quantity data #2 of time interval T2. Because the quantity data #2 and the shadow space with change Δ21 are both presently locked by transaction TX_2 502, transaction TX_1 501 will have to write any intended changes to shadow space 508. The consistent view 507 maintained by transaction TX_1 501 includes the summation of the #2 and Δ21 values. As such both values are read by transaction TX_1 501. Any update to the #2 quantity made by transaction TX_2 502 will not be visible to transaction TX_1 501 because the update will have been made after the start of transaction TX_1 501 and therefore, by definition, is not within the consistent view of transaction TX_1 501. At time t5 transaction TX_2 502 desires access to the quantity value #3 of time interval T3. Because no lock exists on the value and because no committed shadow space changes exist for time interval T3, transaction TX_2 502 is granted a lock on value #3 and reads only value #3 which is the consistent view 509.

At time t6 transaction TX_2 desires access to time interval T4. Because no lock exists on the quantity value #4, a lock is placed on the value #4 for transaction TX_2 502. There also exist three quantity value changes Δ41, Δ42, Δ43 that were committed before the start of transactions TX_1 501 and TX_2 502 which for the sake of example are assumed to be unlocked. As such, transaction TX_2 502 locks and reads quantity value #4 and value changes Δ41, Δ42, Δ43. The summation over these values corresponds to the consistent view 510 for time interval T4 which is maintained by transaction TX_2 502. When transaction TX_2 502 implements its change, it is free to write directly over the #4 value in the time series data 500 and delete the shadow spaces holding committed changes Δ41, Δ42, and Δ43.

At time t7, transaction TX_1 501 desires access to time interval T4. Because the immediately prior access by transaction TX_2 caused the #4 value and Δ41, Δ42, Δ43 value changes to be locked, transaction TX_1 501 will read the quantity value #4 and value changes Δ41, Δ42, Δ43 to build its consistent view 511, but, any change made by transaction TX_1 501 will have to be committed to shadow space 512.

Figure 6:
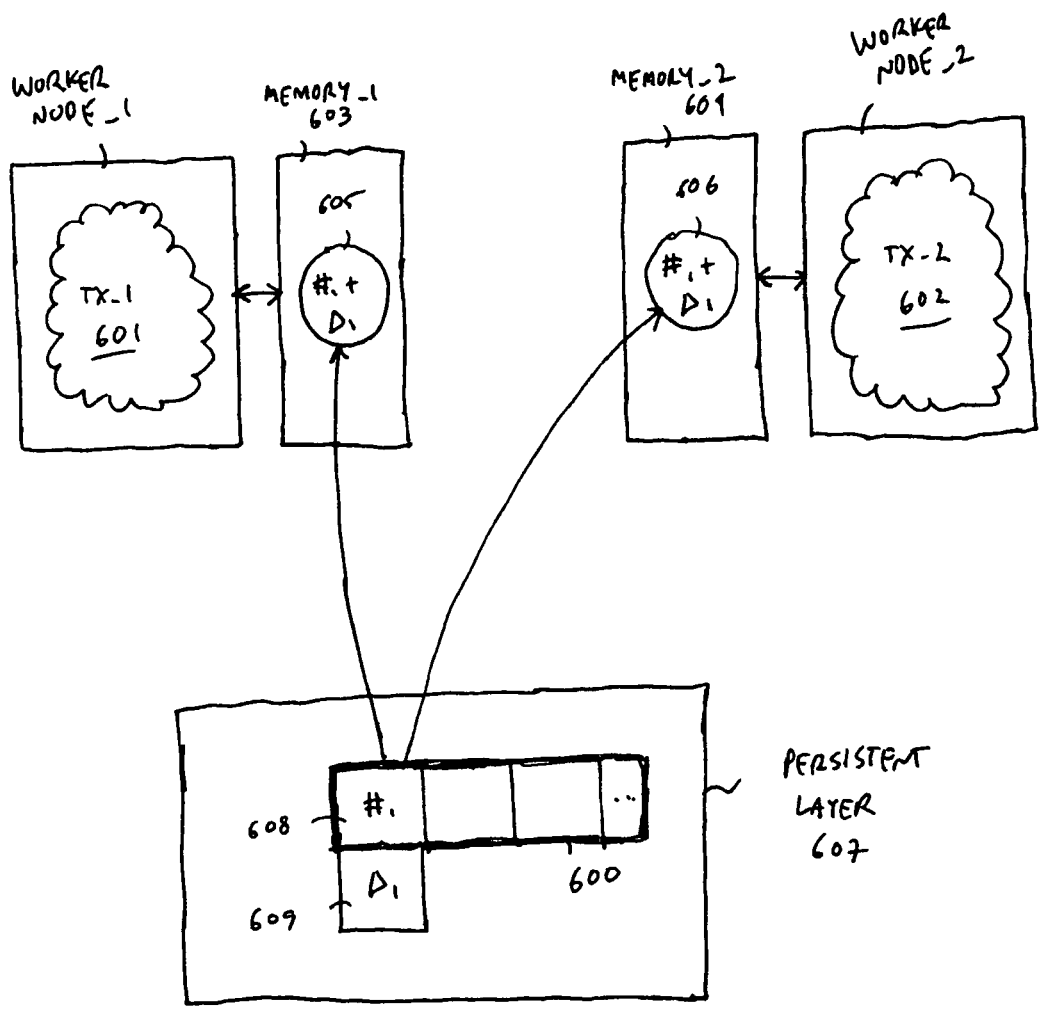
FIG. 6 shows a particular implementation of supply chain management software capable of parallel time interval processing through shadowing.

FIG. 6 shows a possible implementation where a transaction's consistent view is maintained "transiently". According to the depiction of FIG. 6 a time series 600 and its shadow data 609 are persistently stored in a persistence layer 607. The persistence layer 607 may be implemented in various forms such as a hard-disk file system, a database (e.g., a traditional database, an object-relational database management system (ORDMS)) or memory whose content is accessible to multiple worker nodes.

A worker node is focal point for the performance of work. Traditional multi-processor systems have implemented one worker node per CPU (in which case a worker node can also be referred to as an "operating system process"). In cases where there exists a virtual machine or interpreter, each instance of a interpreter (e.g., a Java virtual machine) and the code it executes can be viewed as a worker node. Each worker node instance typically has a collection of application software programs (such as supply-chain-management application software programs) that are executed by the corresponding CPU and/or virtual machine.

Regardless of the perspective (CPU and/or interpreter), each worker node typically can be viewed as having its own "local" memory. Consistent with this perspective, worker node 1 in FIG. 6 uses memory 603 and worker node 2 uses memory 604. Worker node 1 is observed being the worker node that executes transaction TX_1 601 and worker node 2 is observed being the worker node that executes transaction TX_2 602. Worker node 1 may be in the same computing system as worker node 1, or, worker node 1 may be in a different computing system than worker node 2.

A first consistent view 605 for a time interval for transaction TX_1 601 is viewed as being stored in memory 603 and a second consistent view 606 for the same time interval for transaction TX_2 602 is viewed as being stored in memory 604. Memories 603 and 604 are typically implemented with volatile semiconductor memory (e.g., SRAM or DRAM memory space). Over the course of operation of transactions TX_1 601 and TX_2 602, they may refer to or other wise utilize their corresponding consistent views 605, 606. Because volatile memories lose their data if there is some kind of power failure (or, typically, if there is a CPU or virtual machine crash), consistent views 605 and 606 may be referred to as "transient" because if such a malfunction occurs, consistent views 603, 604 will be lost. Because of the high speed, however, at which memories 603, 604 operate it is deemed worthwhile to execute the worker nodes 1 and 2 from them (although, database logging mechanisms allow some safety against data loss in case of system failure (at least for committed transactions).

Figure 7:
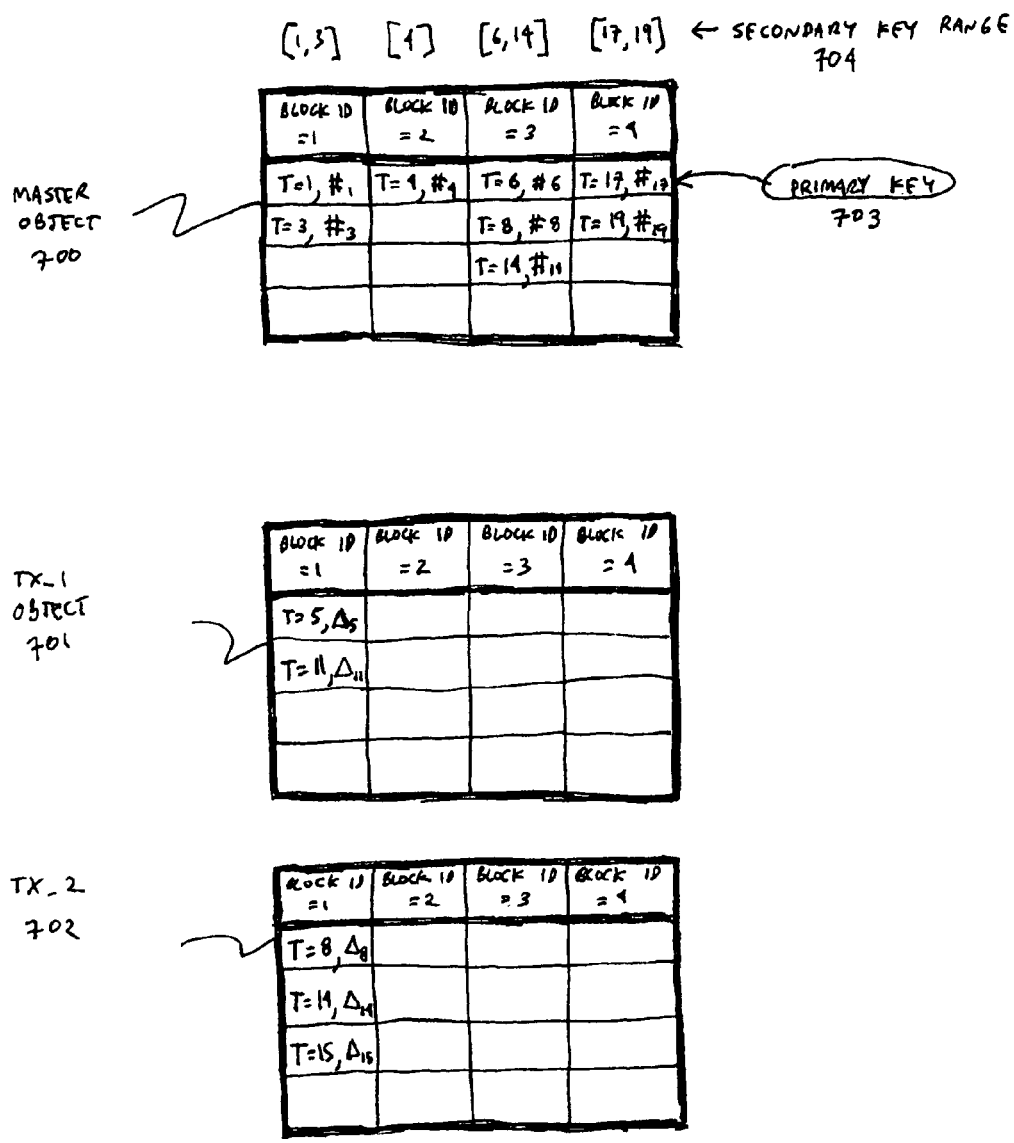
FIG. 7 shows objects for recording a time series and its shadowing data.

FIG. 7 shows a specific implementation of the manner in which the time series and shadow data is kept in persistence layer 607 for an object oriented environment. According to the depiction of FIG. 7 there exists a persisted "master object" 700 which has the time series quantity data. As such, master object 700 is depicted as having actual quantity values as opposed to changes in quantity values (i.e., "#"s rather than "Δ"s). Objects 701 and 702 are the shadow space data belonging to master object 700 and therefore are observed as having changes in quantity values rather than pure quantity values themselves (i.e., objects 701 and 702 have "Δ"s rather than "#"s).

Each of objects 700, 701, 702 are represented as a block array. Here, a plurality of blocks (four blocks per array are observed in the particular example of FIG. 7), where, each block has a plurality of storage spaces for separately addressable items of data (four such spaces per block are observed in the particular example of FIG. 7). In the case of master object 700, each storage space contains a specific time interval value and its associated time series quantity (e.g., (T=1; #1), (T=3; #3), etc.).

A specific time interval's worth of data is accessed by using a certain point within the time interval as a secondary key. This time point can be differently defined for distinct time series, but must be equally defined for a master object and its shadows. As an example the time point can be the start point of the time intervals for master object (and its shadows) and the end point for master object B (and its shadows). A primary key 703, which is a data structure having a value that uniquely identifies the master object 700, is used to access the master object's contents. The secondary key, which identifies a specific time interval (e.g., T=1 for T1; T=2 for T2, etc.), is used to access a particular one of the master object's data entries. Thus, for instance, if the quantity #4 for the T4 time interval is desired, a data structure that includes the primary key and T=4 would be provided to the persistence layer.

According to an implementation, when a transaction accesses a data entry for a particular time interval, locking will be applied to each data entry within a secondary key range that extends across that of the data entry's possible secondary key range. For example, referring to block 3 of master object 700, there exists one "available" data entry slot, neighboring block 2 has a "rightmost/latest" entry of 4 and neighboring block 4 has a "leftmost/earliest" entry of 17. As such, the available entry in block 3 could be used to hold a quantity for a time interval as early as 5 and as late as 16. Therefore access to block 3 results in secondary key range [5, 16] being locked (i.e., a read of these data entries by other transactions is possible but not a write—noting that brackets "[" and "]" correspond to closed interval notation).

Thus, whereas the basic implementation of FIGS. 3 through 5 represented locking on a time interval by time interval basis, according to the implementation of FIG. 7, access to a particular time interval may result in the locking of a plurality of time intervals. This merely expands the scope of those time intervals that will need to have quantity changes persisted into shadow space when a quantity for a specific time interval is accessed. Note also that in the implementation of FIG. 7 shadow space is maintained on a transaction-by-transaction basis. That is, shadow space object 701 maintains the quantity changes that are persisted to "shadow space" by a first transaction (TX_1), and, shadow space object 702 maintains the quantity changes that are persisted to "shadow space" by a second transaction (TX_2).

Assuming there existed a time period in which only three parallel transactions TX_1, TX_2 and TX_3 desired to access the time series represented by master object 700, the particular state of the family of objects 700, 701, 702 observed in FIG. 7 can be viewed as a situation in which, while transaction TX_3 was accessing a data entry from block 3 of the master object 700, transaction TX_1 desired to access time intervals T=5 and T=11. Because of the accessing of the entry within data block 3 by transaction TX_3, the secondary key range [5, 16] was locked forcing transaction TX_1 to commit quantity changes Δ5 and Δ11 for time intervals T5 and T11, respectively, into its corresponding shadow space object 701.

Likewise, at a time when transaction TX_3 was accessing a data entry from block 3 of the master object 700, transaction TX_2 attempted to access time intervals T=8, T=14 and T=15; which, again because of the locking of secondary key range [5, 16] caused TX_2 to commit changes Δ8, Δ14 and Δ15 into its corresponding shadow space object 702. The individual shadow space objects 701, 702 may be made accessible through a counter value that counts parallel transactions. In the examples of above, transaction TX_3 had access to the master object 700 which locked out transactions TX_1 and TX_2 from making direct changes to the master object 700. Parallel transaction TX_1 was the first transaction to be locked out resulting in a counter increment from 00 to 01, and, parallel transaction TX_2 was the second transaction to be locked resulting a counter increment from 01 to 02. By using the counter value as an extension to the primary key 703, each of objects 700, 701, 702 can be uniquely accessed (e.g., if primary key=XXXX, the master object 700 is accessed with value XXXX00, the TX_1 shadow object 701 is accessed with value XXXX01, and, the TX_2 shadow object 702 is accessed with value XXXX02).

In an implementation, quantity change values in a shadow object are visible to "other transactions" (e.g., transactions other than transaction TX_1 in the case of object 701 and transactions other than transaction TX_2 in the case of object 702) only after these changes have been committed. Recalling the discussions of FIGS. 3, 4 and 5 that a transaction's consistent view is built from merging these committed changes along with specific quantity data (e.g., as found in master object 700), FIGS. 8 and 9 describe an implementation for performing this merger.

According to one implementation, the accessing of a particular time interval within the time series quantity data not only causes the locking of an extended secondary key range but also results in a merger that is performed to build the accessing transaction's consistent view over an equidistant secondary key range. Thus, for instance, assuming a fourth transaction TX_4 were to desire access to one of the time interval entries in block 3 of the master object 700 after the values observed in FIG. 7 are all committed, the consistent view would be built with a merger over the range of [5, 16].

In practical implementation, a transaction may be interested in a range of time intervals which may span more than one block. For example, if the fourth transaction TX_4 was discovering whether an order could be placed anywhere within a range of [5, 16], a range of [4, 17] would be locked and merged over. Here, referring to master object 700, the closest leftmost data entry is T=4 and the closest rightmost data entry is T=17. Locking over a range of [4, 17] would lock both blocks 2 and 3 because the T=4 entry is located in block 2.

Figure 8:
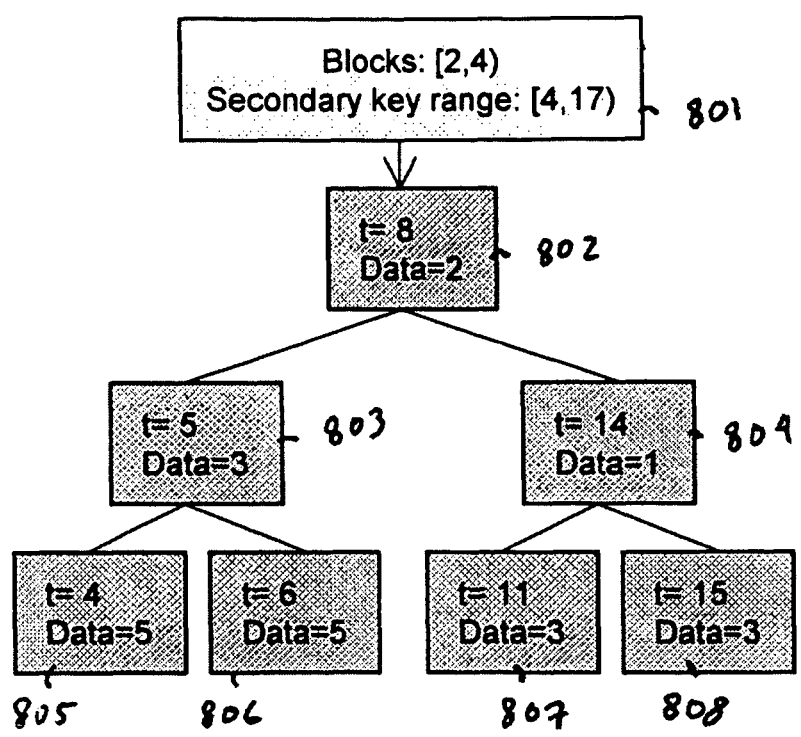
FIG. 8 shows merged time series and shadow data tree

Recalling from the discussion of FIG. 6 that a merger used to build a consistent view may be constructed in transient memory local to a transaction, FIG. 8 shows a technique for performing such a merger for the specific example mentioned just above where the range over which the merger is to be performed is [4, 17]. Here, FIG. 8 shows that the merger can be implemented with a binary tree structure (specifically, a balanced binary tree structure). Here, note that each of the time series quantities in the master object 700 as well as each of the quantity change values in shadow objects 701 and 702 within the secondary key range [4, 17) have been merged together.

Different types of binary tree structures exist such as B-tree, B*-tree, Red Black, Quad and AVL. Binary trees are used to efficiently find information. In the case of an SCM transaction, time series data for the various time intervals of interest to the transaction are constructed in transient memory so that the transaction can rapidly "find", whenever it needs to, a specific time series quantity for specific time interval.

The specific binary tree structure observed in FIG. 8 is for a situation where, in master object 700: #4=5; #6=5; #8=5; #14=5; in shadow object 701: $\Delta 5$=+3; $\Delta 11$=+3; and, in shadow object 702: $\Delta 8$=−3; $\Delta 14$=−4; $\Delta 15$=3. Here, note that in overlapping time intervals amongst the various objects 700, 701, 702 there has been straightforward addition (e.g., for T=8, block 802=#8+$\Delta 8$=5−3=2; and, for T=14, block 804=#14+$\Delta 14$=5−4=1). Where no overlap exists with an actual time series quantity a corresponding time series quantity of zero is assumed (e.g., for T=5, block 803=#5+$\Delta 5$=0+3=3).

Figure 9:
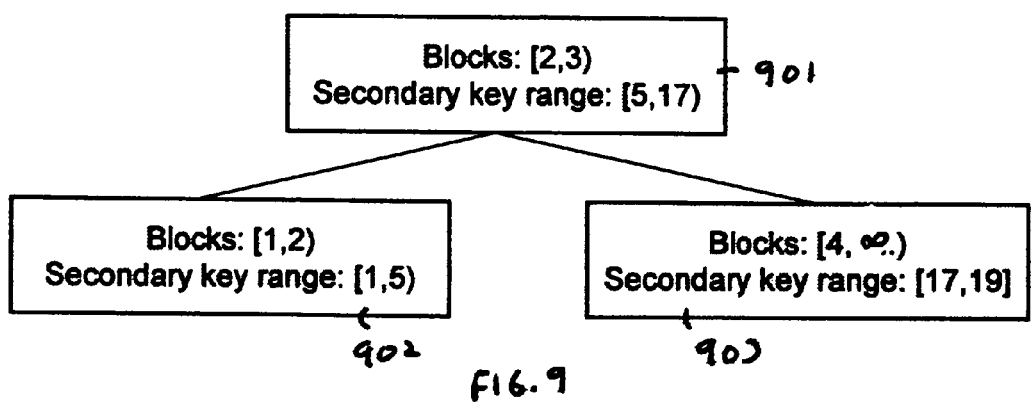
FIG. 9 shows a super-tree of merged times series and shadow data

FIG. 9 shows a "super-tree" structure which is essentially a binary tree formed from smaller binary trees that cover other secondary key ranges the transaction has demonstrated an interest in.

Importantly, for those binary tree secondary key ranges corresponding to mergers created when the transaction had locked access of the master object 700 over the secondary key range (i.e., the transaction has permission to change the time series entries in the master object 700), the binary tree is written over the master object's data within the secondary key range as part of the commitment of the transaction. For example, if the transaction that created the binary tree of FIG. 8 had been given locked access to the master object 700 for the secondary key range [4, 17), the information observed in FIG. 8 would be written into the master object, writing existing time intervals with new data (e.g., for T=8, from #5=5 to #5=2) or entering entirely new entries (e.g., T=5) or removing entries where appropriate. Such writing may cause time interval entries to shift to new blocks within the master object 700.

For those binary tree secondary key ranges corresponding to mergers created when the transaction did not have locked access of the master object 700 over the secondary key range (i.e., the transaction does not have permission to change the time series entries in the master object 700), the binary tree is simply discarded—but—the changes imposed by the transaction are written to its corresponding shadow object.

Note that an entire time series may be contained in a single master object or a group of master objects (if the later, a more senior secondary key may be used to specify a particular master object). Similarly, the shadow space quantity changes for a transaction may be contained in a single shadow space object or a group of shadow space objects.

Figure 10:
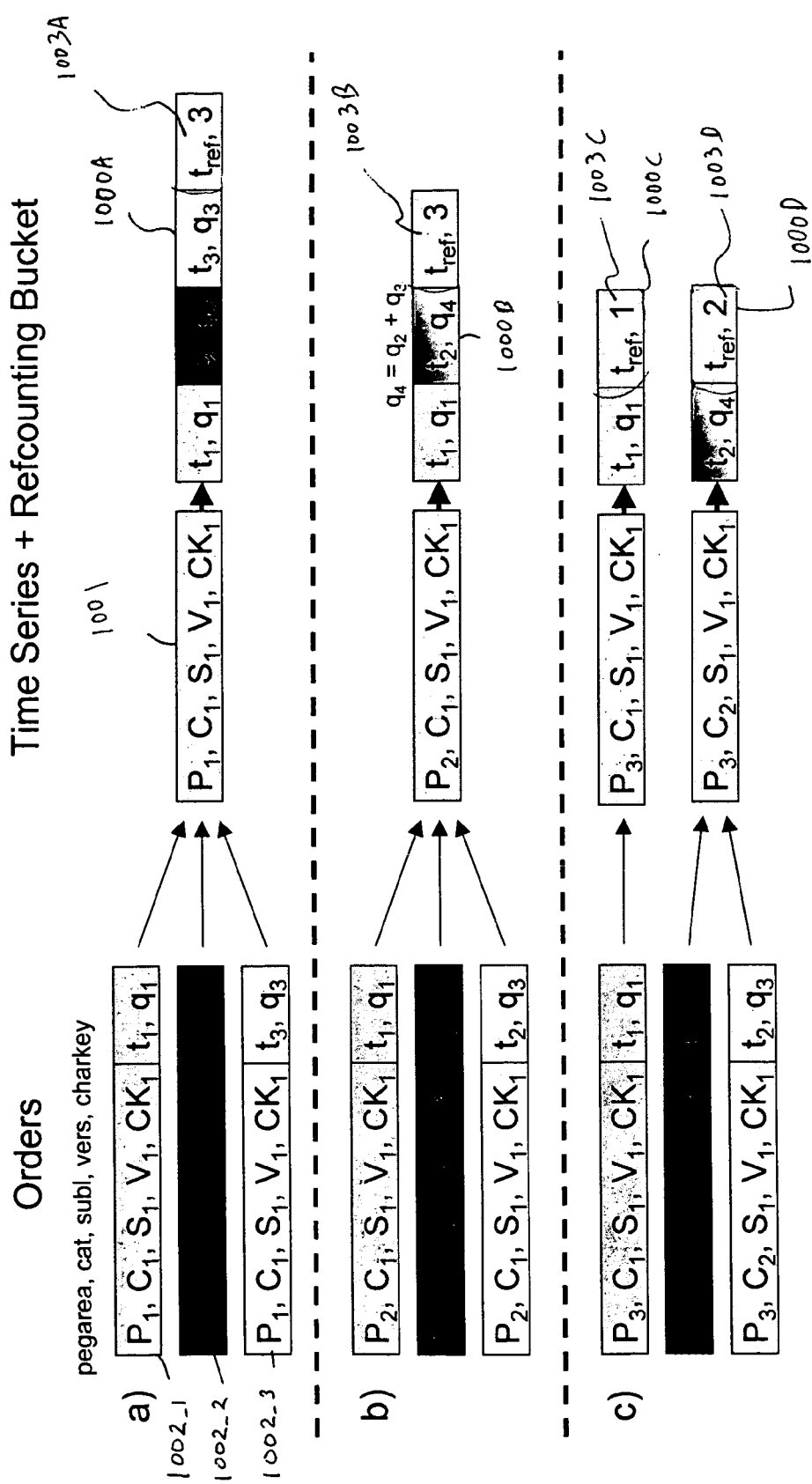
FIG. 10 shows an order count persistently stored with time series data.

Note that multiple orders, whether from the same transaction or different transactions, may need to be traced to their corresponding time series. FIG. 10 shows various orders pointing to a time series object with primary key which consists of the components named P, C, S, V and CK. The components of the primary key are determined by the business logic for which the time series are used. For example, each of orders 1002_1, 1002_2, 1002_3 point to time series object 1001. Notably, a counter that counts how many orders are currently pointing to a particular time series is observed as endpoint in the time series data itself (e.g., counter 1003A has a value of 3 which accounts for each of orders 1002_1, 1002_2 and 1002_3). In the prior art a similar counter was maintained in the handle rather than the time series data. The maintaining of the time counter is pertinent as time series objects can, for performance reasons, be subject to garbage collector or cleanup processes. Empty time series objects may only be deleted if no order is pointing to it. As time series are parallel, the reference counting mechanism has to be parallel, too. The simplest way to achieve this is to use a distinct bucket of a time series object for reference counting (which works as updating a reference counter is a commutative operation, too). The reference counting bucket is identified by a special value of the bucket time (=secondary key).

A particular P/C/SN/CK combination uniquely identifies a particular resource within a supply chain. Here, P corresponds to the resource's pegarea (e.g., a particular warehouse), C corresponds to the resource's category (e.g., the type(s) of order(s) the resource responds to), S corresponds to the resource's sub-location (e.g. a particular location within a warehouse), V corresponds to the resource's version (e.g., a production batch) and CK corresponds to the resource's characteristics (detailed properties of the resource).

Processes taught by the discussion above may be performed with program code such as machine-executable instructions which cause a machine (such as a "virtual machine", a general-purpose processor disposed on a semiconductor chip or special-purpose processor disposed on a semiconductor chip) to perform certain functions. Alternatively, these functions may be performed by specific hardware components that contain hardwired logic for performing the functions, or by any combination of programmed computer components and custom hardware components.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 11:
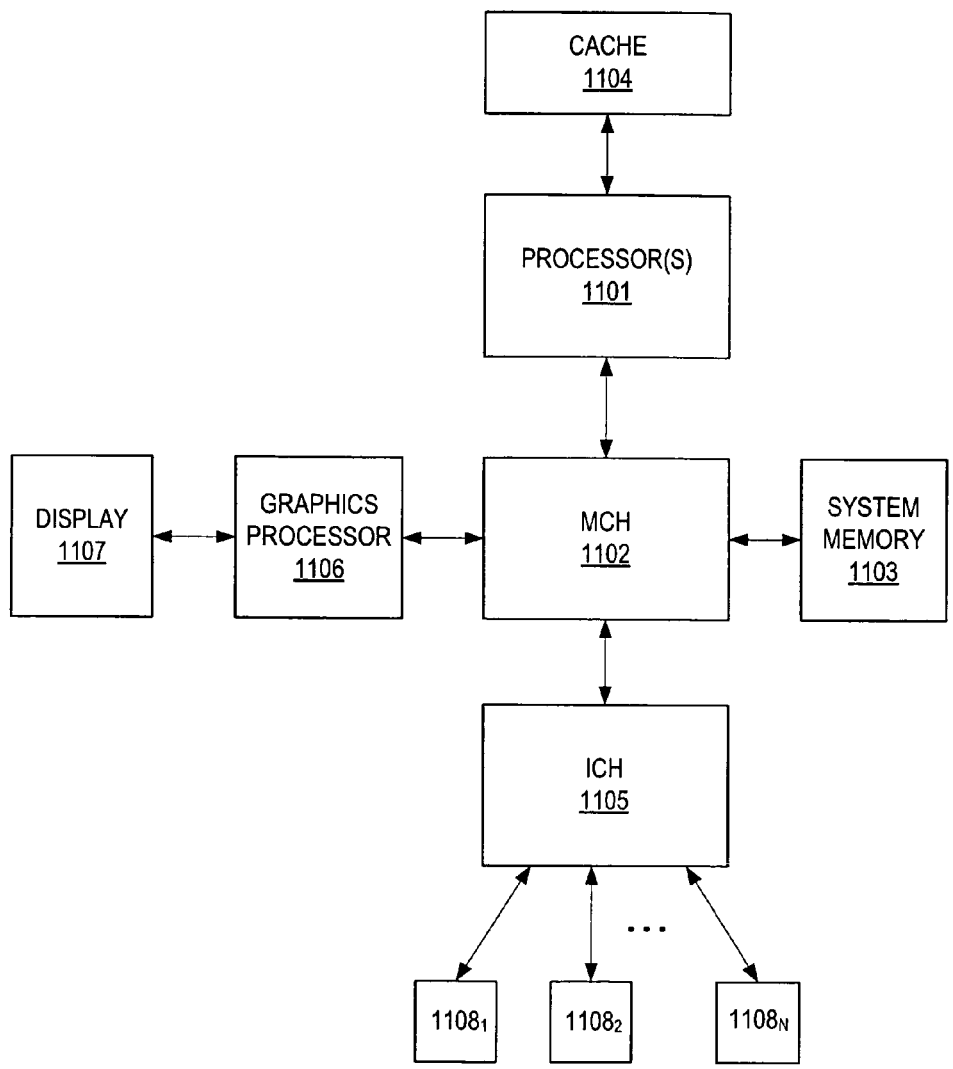
FIG. 11 shows an embodiment of a computing system's hardware design.

FIG. 11 is a block diagram of a computing system 1100 that can execute program code stored by an article of manufacture. It is important to recognize that the computing system block diagram of FIG. 11 is just one of various computing system architectures. The applicable article of manufacture may include one or more fixed components (such as a hard disk drive 1102 or memory 1105) and/or various movable components such as a CD ROM 1103, a compact disc, a magnetic tape, etc. In order to execute the program code, typically instructions of the program code are loaded into the Random Access Memory (RAM) 1105; and, the processing core 1106 then executes the instructions. The processing core may include one or more processors and a memory controller function. A virtual machine or "interpreter" (e.g., a Java Virtual Machine) may run on top of the processing core (architecturally speaking) in order to convert abstract code (e.g., Java bytecode) into instructions that are understandable to the specific processor(s) of the processing core 1106.

FIG. 11 shows an embodiment of a computing system (e.g., "a computer"). The exemplary computing system of FIG. 11 includes: 1) one or more processors 1101; 2) a memory control hub (MCH) 1102; 3) a system memory 1103 (of which different types exist such as DDR RAM, EDO RAM, etc,); 4) a cache 1104; 5) an I/O control hub (ICH) 1105; 6) a graphics processor 1106; 7) a display/screen 1107 (of which different types exist such as Cathode Ray Tube (CRT), Thin Film Transistor (TFT), Liquid Crystal Display (LCD), DPL, etc.; 8) one or more I/O devices 1108.

The one or more processors 1101 execute instructions in order to perform whatever software routines the computing system implements. The instructions frequently involve some sort of operation performed upon data. Both data and instructions are stored in system memory 1103 and cache 1104. Cache 1104 is typically designed to have shorter latency times than system memory 1103. For example, cache 1104 might be integrated onto the same silicon chip(s) as the processor(s) and/or constructed with faster SRAM cells whilst system memory 1103 might be constructed with slower DRAM cells. By tending to store more frequently used instructions and data in the cache 1104 as opposed to the system memory 1103, the overall performance efficiency of the computing system improves.

System memory 1103 is deliberately made available to other components within the computing system. For example, the data received from various interfaces to the computing system (e.g., keyboard and mouse, printer port, LAN port, modem port, etc.) or retrieved from an internal storage element of the computing system (e.g., hard disk drive) are often temporarily queued into system memory 1103 prior to their being operated upon by the one or more processor(s) 1101 in the implementation of a software program. Similarly, data that a software program determines should be sent from the computing system to an outside entity through one of the computing system interfaces, or stored into an internal storage element, is often temporarily queued in system memory 1103 prior to its being transmitted or stored.

The ICH 1105 is responsible for ensuring that such data is properly passed between the system memory 1103 and its appropriate corresponding computing system interface (and internal storage device if the computing system is so designed). The MCH 1102 is responsible for managing the various contending requests for system memory 1103 access amongst the processor(s) 1101, interfaces and internal storage elements that may proximately arise in time with respect to one another.

One or more I/O devices 1108 are also implemented in a typical computing system. I/O devices generally are responsible for transferring data to and/or from the computing system (e.g., a networking adapter); or, for large scale non-volatile storage within the computing system (e.g., hard disk drive). ICH 1105 has bi-directional point-to-point links between itself and the observed I/O devices 1108.

It is believed that processes taught by the discussion above can be practiced within various software environments such as, for example, object-oriented and non-object-oriented programming environments, Java based environments (such as a Java 2 Enterprise Edition (J2EE) environment or environments defined by other releases of the Java standard), or other environments (e.g., a .NET environment, a Windows/NT environment each provided by Microsoft Corporation).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A method, comprising:
reading program code from memory and processing said program code with one or more processors to perform the following:
in response to a request for a first transaction to change a quantity value at a node indicating an availability of a resource or item for a time interval within a time series, providing said quantity value at said node to said first transaction;
prior to changing of the quantity value at said node by said first transaction and in response to a second transaction to change said quantity value at said node, said second transaction initiated after the first transaction and operating concurrently with said first transaction on said quantity value at said node, providing said quantity value for said time interval to said second transaction, said second transaction not permitted to change said quantity value because said quantity value has been provided to said first transaction;
permitting said first transaction to change said quantity value to a new quantity value for said time interval,
permitting said second transaction to record a quantity change amount for said time interval; and
after the first and second transactions have committed, providing said new quantity value as changed by said first transaction and said quantity change amount as recorded by said second transaction to a third transaction to build a consistent view for said time interval by adding said new quantity value and said quantity change amount to provide an updated quantity value of the availability of said resource or item.

2. The method of claim 1 wherein said second transaction records said quantity change amount for said time interval before said first transaction changes said quantity value for said time interval to said new quantity value.

3. The method of claim 1 further comprising permitting said third transaction to place a write lock on said new quantity value because no other transactions possessed a write lock on said new quantity value when said third transaction expressed a desire for said time interval's quantity value.

4. The method of claim 3 further comprising providing said new quantity value as changed by said first transaction and said quantity change amount as recorded by second transaction to fourth and fifth transactions while said third transaction has said write lock on said new quantity value.

5. The method of claim 4 further comprising said fourth and fifth transactions recording respective quantity change amounts for said time interval while said third transaction has said write lock on said new quantity value.

6. The method of claim 5 further comprising permitting said third transaction to change said new quantity value for said time interval to a second new quantity value for said time interval, said third transaction releasing said write lock thereafter.

7. The method of claim 5 wherein one of said fourth and fifth transactions records its respective quantity change amount before said third transaction changes said new quantity value to said second new quantity value and the other of said fourth and fifth transactions records its respective quantity change amount after said third transaction changes said new quantity value to said second new quantity value.

8. An article of manufacture including program code stored on a machine readable storage medium which, when executed by a machine, causes the machine to perform the operations comprising:

in response to a request for a first transaction to change a quantity value at a node indicating an availability of a resource or item for a time interval within a time series, providing said quantity value at said node to said first transaction;

prior to changing of the quantity value at said node by said first transaction and in response to a second transaction to change said quantity value at said node, said second transaction initiated after the first transaction and operating concurrently with said first transaction on said quantity value at said node, providing said quantity value for said time interval to said second transaction, said second transaction not permitted to change said quantity value because said quantity value has been provided to said first transaction;

permitting said first transaction to change said quantity value to a new quantity value for said time interval, permitting said second transaction to record a quantity change amount for said time interval; and, after the first and second transactions have committed, providing said new quantity value and said quantity change amount to a third transaction so that said third transaction can build a consistent view for said time interval by adding said new quantity value and said quantity change amount to provide an updated quantity value of the availability of said resource or item.

9. The article of manufacture of claim 8 wherein said second transaction records said quantity change amount for said time interval before said first transaction changes said quantity value for said time interval to said new quantity value.

10. The article of manufacture of claim 8 further comprising permitting said third transaction to place a write lock on said new quantity value because no other transactions possessed a write lock on said new quantity value when said third transaction expressed a desire for said time interval's quantity value.

11. The article of manufacture of claim 8 further comprising providing said new quantity value as changed by said first transaction and said quantity change amount as recorded by said second transaction to fourth and fifth transactions while said third transaction has said write lock or said new quantity value.

12. The article of manufacture of claim 11 further comprising said fourth and fifth transactions recording respective quantity change amounts for said time interval while said third transaction has said write lock on said new quantity value.

13. The article of manufacture of claim 12 further comprising permitting said third transaction to change said new quantity value for said time interval to a second new quantity value for said time interval, said third transaction releasing said write lock thereafter.

14. The article of manufacture of claim 12 wherein one of said fourth and fifth transactions records its respective quantity change amount before said third transaction changes said new quantity value to said second new quantity value and the other of said fourth and fifth transactions records its respective quantity change amount after said third transaction changes said new quantity value to said second new quantity value.

15. A computing system comprising a machine, said computing system also comprising instructions disposed on a computer readable storage medium, said instructions when executed by said machine perform operations comprising:

in response to a request for a first transaction to change a quantity value at a node indicating an availability of a resource or item for a time interval within a time series, providing said quantity value at said node to said first transaction;

prior to changing of the quantity value at said node by said first transaction and in response to a second transaction initiated after the first transaction and operating concurrently with said first transaction to change said quantity value at said node, said second transaction, providing said quantity value for said time interval to said second transaction, said second transaction not permitted to change said quantity value because said quantity value has been provided to said first transaction;

permitting said first transaction to change said quantity value to a new quantity value for said time interval, permitting said second transaction to record a quantity change amount for said time interval; and after the first and second transactions have committed, providing said new quantity value as changed by said first transaction and said quantity change amount as recorded by said second transaction to a third transaction to build a consistent view for said time interval by adding said new quantity value and said quantity change amount to provide an updated quantity value of the availability of said resource or item.

16. The computing system of claim 15 further comprising providing said new quantity value as changed by said first transaction and said quantity change amount as recorded by said second transaction to fourth and fifth transactions while said third transaction has said write lock or said new quantity value.

17. The computing system of claim 16 further comprising said fourth and fifth transactions recording respective quantity change amounts for said time interval while said third transaction has said write lock on said new quantity value.

18. The computing system of claim 17 further comprising permitting said third transaction to change said new quantity value for said time interval to a second new quantity value for said time interval, said third transaction releasing said write lock thereafter.

19. The computing system of claim 17 wherein one of said fourth and fifth transactions records its respective quantity change amount before said third transaction changes said new quantity value to said second new quantity value and the other of said fourth and fifth transactions records its respective quantity change amount after said third transaction changes said new quantity value to said second new quantity value.

* * * * *